Figure 1:
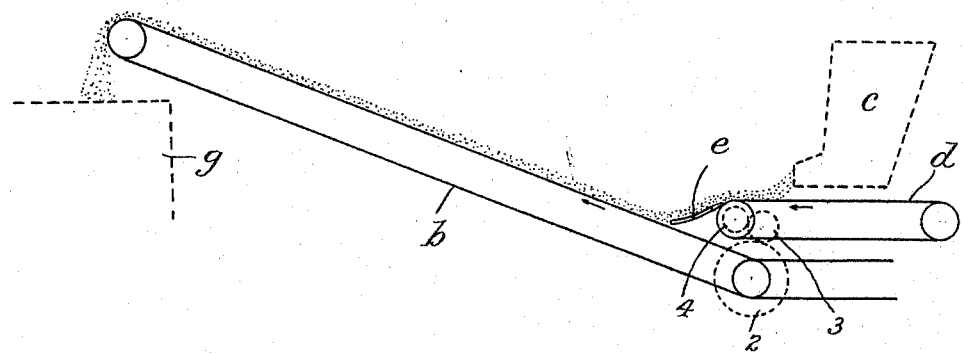

W. L. SCOTT.
BELT CONVEYER.
APPLICATION FILED DEC. 4, 1916.

1,325,704.

Patented Dec. 23, 1919.

Witness:
William JC. Hewetson

William L. Scott
Inventor
per Attorney

UNITED STATES PATENT OFFICE.

WILLIAM L. SCOTT, OF MONTREAL, QUEBEC, CANADA.

BELT CONVEYER.

1,325,704.     Specification of Letters Patent.     Patented Dec. 23, 1919.

Application filed December 4, 1916. Serial No. 135,039.

*To all whom it may concern:*

Be it known that I, WILLIAM L. SCOTT, a subject of the King of Great Britain, residing in the city of Montreal, Province of Quebec, Dominion of Canada, have invented certain new and useful Improvements in Belt Conveyers; and I do hereby declare that the following is a full, clear, and exact description of the same.

My invention relates particularly to belt conveyers for grain, gravel and other materials, the coefficient of friction of which is comparatively low, and consequently material of this nature cannot be practically loaded onto a conveyer belt traveling upwardly at an angle at which the grain or other loose commodity will slide back, and my invention has for its object to provide a means for accelerating the movement of the commodity at the time it is being delivered upon this conveyer belt. Heretofore it has been the practice to employ buckets or other carrier means to lift the loose commodity to a higher level, even when the commodity is moving, it being necessary to deposit it into a bin or other receptacle, from which bucket other like carrier lifts it. I have discovered that by accelerating the speed at which the commodity moves instead of depositing it and forthwith arresting its motion the continuity of flow can be maintained.

To this end my invention may be said briefly to consist of the combination with an upwardly inclined belt and chute or other conveyer delivering a commodity in the vicinity of the lower end of the inclined belt of means adapted to act upon the commodity at the lower end of the inclined belt and accelerating the speed of delivery thereof onto the said inclined belt.

Figure 2:
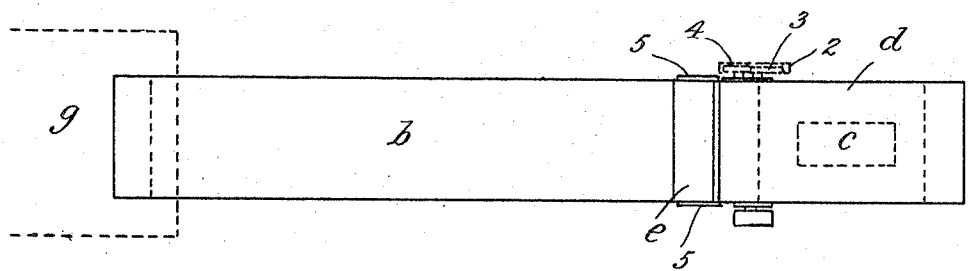

For further comprehension, however, of my invention reference must be had to the accompanying drawings in which similar reference characters indicate the same parts and wherein;

Figure 1 is a diagrammatical side elevation of an inclined conveyer belt with my accelerator applied thereto and Fig. 2 is a plan view thereof.

For purposes of illustration I have shown an inclined belt *b* for delivering grain from a hopper *c*, which would, under ordinary circumstances, deliver the grain at the point where it is situated and it would be necessary to provide for the lifting of it to the higher level, which delivery is desired. I avoid this by placing an auxiliary belt *d* beneath the mouth of the hopper and extending to a point over the lower end of the inclined belt, while a plate *e* bridges the space between this horizontal belt and the inclined belt. Belt *d* is driven at a sufficiently higher speed than belt *b*, to so accelerate the travel of the commodity that it will slightly exceed the speed of travel of the inclined belt, thereby giving it a start in the forwardly inclined direction, which has the effect of increasing its coefficient of friction and enabling the belt to carry it up to the higher level.

These belts may be driven by any preferred means, but I prefer to drive the accelerator belt from the conveyer belt and for this purpose mount a train of gears 2, 3 and 4 in any suitable frame with the gears 2 and 4 carried rigidly by the shafts of the belts, this train of gears being so timed that the required accelerated speed will be given to belt *d*. The bridging plate *e* is secured to brackets 5 fastened to the carrier frame in any suitable manner.

With my accelerator commodity may be delivered from a hopper, the mouth of which is at a lower level than the mouth of a bin *g* or hatch of a vessel, or other receptacle for receiving it at a higher level without arresting or retarding the flow or in any way interrupting the continuity thereof. Thus enabling commodities, the coefficient friction of which is practically low to be loaded onto a conveyer belt inclined to an angle beyond the limit at which grain or other like material will not slide back.

Although I have illustrated my invention applied to the delivery of grain from a hopper to a receptacle by a higher level any loose commodity can be delivered from any other source than a hopper without departing from the spirit of my invention.

What I claim is as follows:—

1. In means for the transshipment of a loose commodity the combination with a bin or other structure for receiving or otherwise obstructing the loose commodity and an inclined conveyer belt for delivering the loose commodity from the bottom of the said obstructing structure, of means for imparting movement to the commodity issuing from the said obstructing structure and feeding the same onto the inclined belt at substantially the same speed as the inclined belt, the said last mentioned means consisting of a horizontal belt adapted to receive the loose commodity from the obstructing structure and deliver the same onto the inclined conveyer, and means for driving the horizontal belt at a greater speed than the inclined belt.

2. In means for the transshipment of a loose commodity the combination with a bin or other structure for receiving or otherwise obstructing the loose commodity, and an inclined conveyer belt for delivering the loose commodity from the bottom of the said obstructing structure, of means for imparting movement to the commodity issuing from the said obstructing structure and feeding the same onto the inclined belt at a speed adapted to counteract the tendency of the commodity to roll back, the said last mentioned means consisting of a horizontal belt adapted to receive the loose commodity from the obstructing structure and delivering the same onto the inclined conveyer and means for driving the horizontal belt at a greater speed than the inclined belt, and a bridging plate between the horizontal and inclined belts.

In testimony whereof I have signed my name to this specification in the presence of two witnesses.

WILLIAM L. SCOTT.

Witnesses:
  WILLIAM J. C. HEWETSON,
  C. J. E. CHARBONNEAU.